United States Patent
Girinon

(10) Patent No.: US 6,991,478 B2
(45) Date of Patent: Jan. 31, 2006

(54) ELECTRICAL CONNECTION DEVICE TO MAKE A METALLISATION POINT, SUPPORT EQUIPPED WITH SUCH A CONNECTION DEVICE AND AIRCRAFT EQUIPPED WITH SUCH A SUPPORT

(75) Inventor: Olivier Girinon, Saint Genest Lerpt (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/028,231

(22) Filed: Jan. 4, 2005

(65) Prior Publication Data
US 2005/0153586 A1  Jul. 14, 2005

(30) Foreign Application Priority Data
Jan. 8, 2004  (FR) .................................. 04 50045

(51) Int. Cl.
*H01R 4/66* (2006.01)
(52) U.S. Cl. ....................................................... 439/92
(58) Field of Classification Search ................ 439/620, 439/939, 84, 86, 782, 109, 92–100, 810–815, 439/610, 98, 412; 414/429–431, 36–44, 414/361, 54–55
See application file for complete search history.

(56) References Cited

U.S. PATENT DOCUMENTS

| 2,061,629 | A | * | 11/1936 | Huck ........................... 411/34 |
| 3,922,050 | A | | 11/1975 | Lettini, et al. |
| 5,213,460 | A | * | 5/1993 | Sadri et al. ..................... 411/43 |
| 5,429,464 | A | * | 7/1995 | Eshraghi ....................... 411/43 |
| 5,651,649 | A | * | 7/1997 | Sadri et al. ..................... 411/34 |
| 6,746,285 | B2 | * | 6/2004 | Delcourt et al. ............ 439/766 |
| 6,877,996 | B1 | * | 4/2005 | Franks, Jr. ..................... 439/92 |
| 6,877,997 | B2 | * | 4/2005 | Schaty ......................... 439/92 |
| 6,884,119 | B2 | * | 4/2005 | Brooks et al. .............. 439/620 |

FOREIGN PATENT DOCUMENTS

| EP | 0 891 007 A1 | 1/1999 |
| EP | 0 971 440 A1 | 1/2000 |
| FR | 2 265 194 | 10/1975 |

* cited by examiner

Primary Examiner—J. F. Duverne
(74) Attorney, Agent, or Firm—Oblon, Spivak, McClelland, Maier & Neustadt, P.C.

(57) ABSTRACT

The electrical connection device (2) comprises:
at least one electrically conducting contact part (20), with first and second substantially opposite faces (22, 24), the first face being provided with a shoulder (26) delimiting a peripheral part (28) with a peripheral face (30), and a central part (32) with a central face (34),
at least one seal (8), and
means of fastening the device on a support (10), capable of maintaining electrical contact between said support (10) and said contact part (20).

Application for making a metallisation point by fastening an electrical connection device (2) on a support (10) provided with at least one electrically conducting support face (12).

18 Claims, 4 Drawing Sheets

ELECTRICAL CONNECTION DEVICE TO MAKE A METALLISATION POINT, SUPPORT EQUIPPED WITH SUCH A CONNECTION DEVICE AND AIRCRAFT EQUIPPED WITH SUCH A SUPPORT

TECHNICAL FIELD

This invention relates to the technical field of electrical connections between conducting elements.

More particularly, it relates to an electrical connection device arranged on an electrically conducting support so as to make an electrical contact point, also called a metallisation point, on this support. Such metallisation points are used to connect the support to an electrically conducting member. This device may for example be a braid fitted with a lug. The electrical connection between the support and the braid is then made by fixing the lug of the braid on the connection device of the support.

This type of connection may be used to make the support equipotential with other electrically conducting elements, for example by electrical grounding so as to prevent accumulation of electrostatic charges on this support, which could cause sudden electrostatic discharges that could create a fire or explosion, which should be avoided.

This type of connection may also be used to provide protection against lightning, for example if it is required to perform faradisation of a chamber for which at least a part is delimited by such a support.

This type of connection can also be used to make functional current returns, for example the return through the support of the 0 volt of an electrical equipment installed on an automobile vehicle.

The invention also relates to an electrically conducting support provided with one or several connection devices that make the corresponding number of metallisation points on this support.

The invention also relates to an aircraft equipped with such a support. For example, an aircraft such as an Airbus A340 requires the presence of more than 5000 metallisation points for the connection of electrical systems, and many other metallisation points designed to achieve equipotentiality of equipment, and particularly hydraulic or storage equipment, or equipment for the transport of fuel.

STATE OF PRIOR ART

One known metallisation point is shown in FIG. 1, by electrical connection of an electrically conducting support 110 to an electrically conducting braid 200 fitted with a lug 210.

The support 110 is in the form of a plate. The lug 210 is fixed to a connection support 100 that is in the form of a mechanical assembly composed of a screw 114, a nut 116 and a washer 118. The screw 114 is inserted in a through hole 112 formed in the support 110 and held in place using the nut 116. The conducting washer 118 is inserted between the head of the screw 114 and the facing surface of the support 110. The lug 210 is in the form of a ring clamped between the head of the screw 114 and the conducting washer 118.

The metallisation point is composed of the combination of the connection device and the corresponding part of the support, in other words surface areas surrounding each of the orifices of the through hole 112.

Setting up the electrical connection between the support 110 and the connection device 100 includes a step of stripping the support surface around each orifice of the through hole 112. This stripping consists of removing any material that could alter the conductivity of said surface, for example paint or corroded material. In some cases, the nature of the material from which the support 110 or its free surfaces are made, requires that a layer of neutral and insulating material should be applied on the stripped zone 120 in order to close off the microspaces that may exist between the exposed surface of the stripped area 120 and the part (lug 210 or nut 116) that comes into contact with it. This is the case particularly when the support 110 is made of aluminium.

In this embodiment of prior art, the stripped connection area 120 is more extensive than the mechanical assembly 114, 116, 118, so as to guarantee good performance of the electrical connection between said support 110 and said mechanical assembly 114, 116, 118. Therefore, part 122 of the stripped area 120 is covered by the lug 210, the screw 114, the nut 116 or the washer 118, and part 124 of this same stripped area 120 is not covered by one of these elements. This uncovered part 124 is not protected against corrosion. Therefore the use of a metallisation point in accordance with prior art requires that this uncovered part 124 should be coated with a coat of protective varnish 126 after having been subjected to a degreasing treatment.

This solution according to prior art has a number of disadvantages.

A first disadvantage lies in the fact that the protective varnish must firstly be prepared before being applied, using a brush. The preparation time and the varnish application time are relatively long, which induces high application costs.

A second disadvantage lies in the fact that the protective varnish is usually insulating, which makes checks on the electrical connection difficult after the varnish has been applied.

A third disadvantage lies in the fact that the varnish can scale with time, which modifies protection of the uncovered part 124 against corrosion, and requires additional maintenance operations. It is then necessary to disassemble the mechanical assembly composed of the lug 210, screw 114, nut 116, and the washer 118 and once again strip the surface surrounding the orifice of the through hole 112 before reassembling the mechanical assembly 210, 114, 116, 118. These disassembly, stripping and reassembly operations require that the structure on which the support 110 is installed should be taken out of service. Immobilisation costs are high, particularly when said structure is an aircraft. It is important to respect a brief time lapse between stripping and reassembly to avoid a risk of renewed corrosion of the uncovered part 124. In practice, there is a tendency to perform the stripping operation without performing disassembly and reassembly operations, in order to reduce immobilisation times. But this introduces other problems, such as the difficulty in accessing the uncovered surface with the stripping tool, and dispersion of stripping dust into the structure.

SUMMARY OF THE INVENTION

The invention relates to a connection device designed to make a metallisation point on a support that does not have the disadvantages inherent to the connection device according to prior art described above.

According to a first aspect, the invention relates to an electrical connection device designed to make a metallisation point on an electrically conducting support.

According to a first embodiment of the first aspect of the invention, the electrical connection device that will be used to make a metallisation point on a support with an electrically conducting support phase, comprises:

an electrically conducting contact part, with a peripheral part and a central part, and with first and second substantially opposite faces, the first face having a peripheral face corresponding to the peripheral part and a central face corresponding to the central part, the peripheral face and the central face being delimited by a shoulder, and said central face being substantially plane so as to come into substantially plane contact with the support face, when in service, a seal, designed to be compressed between the peripheral face of the contact part and the support face, when in service, and means of fastening the device on the support, said fastening means being capable of maintaining electrical contact between said conducting support face and said contact part.

When the support comprises a support hole opening up on at least said electrically conducting support face, said fastening means comprise:

a hole in the contact part, passing through this part along an axial direction substantially centred with respect to its central part and with respect to its peripheral part, and a rod that will pass through said hole in the contact part and will be inserted in said support hole, when in service.

According to a second embodiment of the first aspect of the invention, the electrical connection device that will make a metallisation point on a support, said support having two electrically conducting support faces substantially opposite each other, and a support hole passing through said support, that opens up on each of said support faces, comprises:

two electrically conducting contact parts, each with a peripheral part and a central part, and each having first and second substantially opposite faces, each first face having a peripheral face corresponding to the peripheral part and a central face corresponding to the central part, the peripheral face and the central face being delimited by a shoulder, and said central face being substantially plane so as to come substantially into plane contact with one of the support faces, when in service, two seals, designed to be compressed between the peripheral face on one of the contact parts and on one of the two support faces respectively, when in service, means of fastening the device on the support, said fastening means being capable of maintaining electrical contact between said conducting support faces and said contact parts.

Preferably, according to this second embodiment, the fastening means comprise:

a hole in one of the two contact parts, passing through it along an axial direction substantially centred with respect to its central part and its peripheral part, a hole in the other contact part, passing through it along an axial direction substantially centred with respect to its central part and with respect to its peripheral part, through fastening means with an axial direction, designed to pass firstly through the hole in one of the contact parts, then through the support hole, then through the hole in the other contact part, when in service.

According to a first variant of the second embodiment, said through fastening means comprise a screw/nut assembly, the screw having a screw stem that will pass through the hole of one of contact parts, then the support hole, then the hole in the other contact part, when in service, and the screw having a screw head designated to bear in contact with the second face of one of the contact parts, when in service, and the nut being designed to bear in contact with the second face of the other contact part, when in service.

According to a second variant of the second embodiment, said through fastening means comprise two clamping parts, each clamping part comprising a cylindrical part terminating at one end by an end collar and provided with locking means at the other ends the locking means of the two clamping parts being capable of cooperating to lock said two clamping parts together, and each end collar being designed to bear in contact with the second face of one of the two contact parts, when in service.

According to a third variant of the second embodiment, said through fastening means comprise a combination of a screw/nut assembly such as the assembly in the first variant, and two clamping parts such as the clamping part in the second variant, the cylindrical parts of said clamping parts being hollow and being capable of housing a through rod, for example like the screw stem of the screw/nut assembly, when in service.

Preferably, the contact part(s) is (are) made from an electrically conducting metal. Even more preferably, this metal is steel, and the surface(s) of the contact part(s) is (are) treated against corrosion.

Preferably, the seal(s) is (are) one or more O-rings.

Preferably, the electrical connection device according to the first or second embodiment also comprises means of retaining the seal(s).

According to a second aspect, the invention relates to an electrically conducting support comprising at least one conducting support face, and provided with at least one connection device according to the first aspect of the invention, so as to make at least one metallisation point on said support.

The central face of each contact part of the connection device comes into plane contact with an area called the contact area of the corresponding support face. This contact area is preferably stripped.

Said support may comprise a support hole, a blind hole or a through hole passing through said support, that opens up on at least one face of said support through a corresponding support orifice, or it may not have any hole to make this metallisation point.

In the presence of a support hole, the contact area is located around the orifice of the hole opening up on this support face.

One advantage of the connection device according to the invention lies in the fact that (i) the electrical contact is made between each stripped contact area on the conducting face(s) of the support and the corresponding contact part, that is electrically conducting, (ii) each contact area is kept air tight and therefore protected from corrosion due to the presence of a seal, (iii) means of fastening the connection device on the support contribute firstly to making the electrical contact between the contact part and the support face and secondly compressing the seal between said contact part and said support face.

Finally, according to a third aspect, the invention relates to an aircraft equipped with at least one support according to the second aspect of the invention.

BRIEF DESCRIPTION OF THE DRAWINGS

The invention will be better understood after reading the detailed description given below of particular embodiments of the invention that are provided for illustrative purposes and are in no way limitative, with reference to the attached drawings in which.

DETAILED DESCRIPTION OF PARTICULAR EMBODIMENTS

Figure 1:
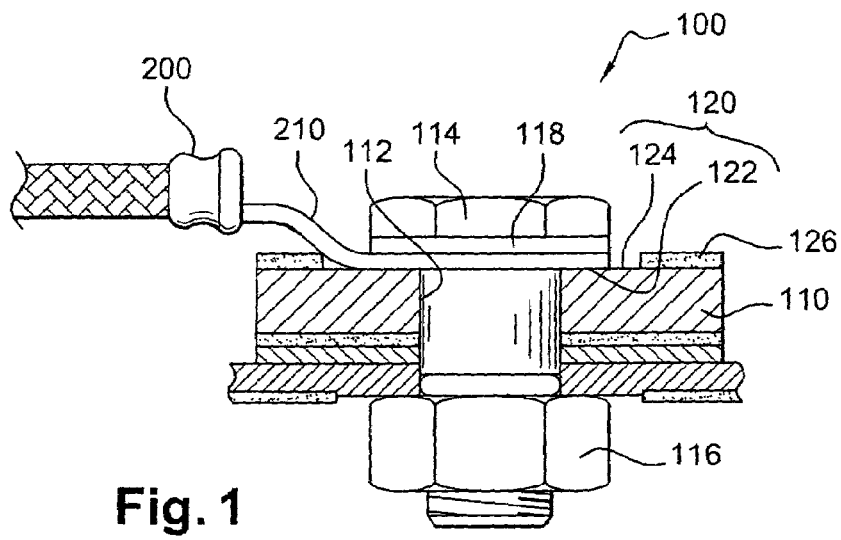
FIG. 1, already described, shows a longitudinal section illustrating a metallisation point according to prior art.

The connection device 2 according to the invention will now be described with reference to the figures, considering the following in sequence:

the first embodiment of the connection device 2, more particularly adapted to a support 10 with at least one electrically conducting support face 12, and the second embodiment of the connection device 2, more particularly adapted to a support 10 with two electrically conducting support faces 12 substantially opposite each other.

According to the first embodiment shown in FIGS. 2 to 5, the connection device 2 comprises a contact part 20, a seal 8 and fastening means 18, 36, 38, 52, 54, 56, 58, 60, 62, 64 for fastening the connection device 2 onto the support 10.

The contact part 20 is a conducting part that will come into contact with the contact area 14 of the conducting support face 12. It is preferably made of a conducting material, for example such as steel with a surface treated against corrosion. It comprises a first face 22 and a second face 24 substantially opposite the first face. The first face 22 comprises a peripheral face 30 and a central face 34 that are delimited by a shoulder 26, and that correspond to a peripheral part 28 and a central part 32 of the contact part 20, respectively. The second face 24 of the contact part 20 is preferably substantially plane.

The seal 8 is designed to keep the contact area 14 of the conducting face 12 air tight to prevent it from corroding. The seal 8 is preferably an O-ring. It is preferably made from an elastomer compatible with the environmental conditions (temperature, pressure, etc.), usually encountered in an aircraft.

Fastening means 18, 36, 38, 52, 54, 56, 58, 60, 62, 64, 66 for fastening the connection device 2 onto the support 10 are capable of maintaining an electrical contact between the conducting support face 12 and the contact part 20.

The first embodiment of the electrical connection device is particularly adapted to a support 10 comprising a support hole 16 opening up on at least its conducting face 12. According to this first embodiment, the fastening means 18, 36, 38, 52, 54, 56, 58, 60, 62, 64 comprise:

a hole 36 in the contact part 20, passing through it along an axial direction and substantially centred with respect to its peripheral part 28 and with respect to its central part 32, and a rod 52, that will pass through the hole in the contact part 36 and be inserted in the support hole 16, when in service.

Figure 3:
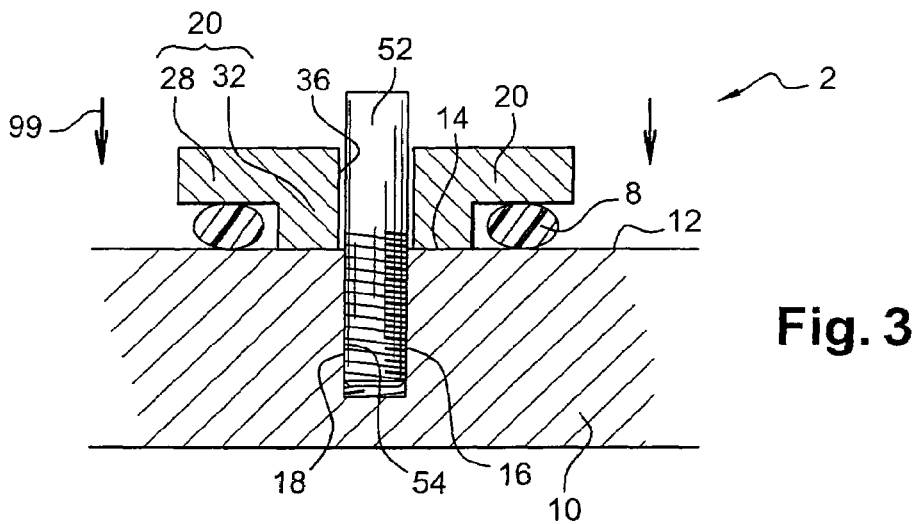
FIG. 3 shows a longitudinal section illustrating fastening means according to a first variant of the first embodiment of the connection device.

According to a first variant of the first embodiment shown in FIG. 3, the fastening means may comprise a first thread 54 of the rod 52 and a thread 18 in the support hole 16 that cooperate to fix the rod 52 to the support 10.

Figure 4:
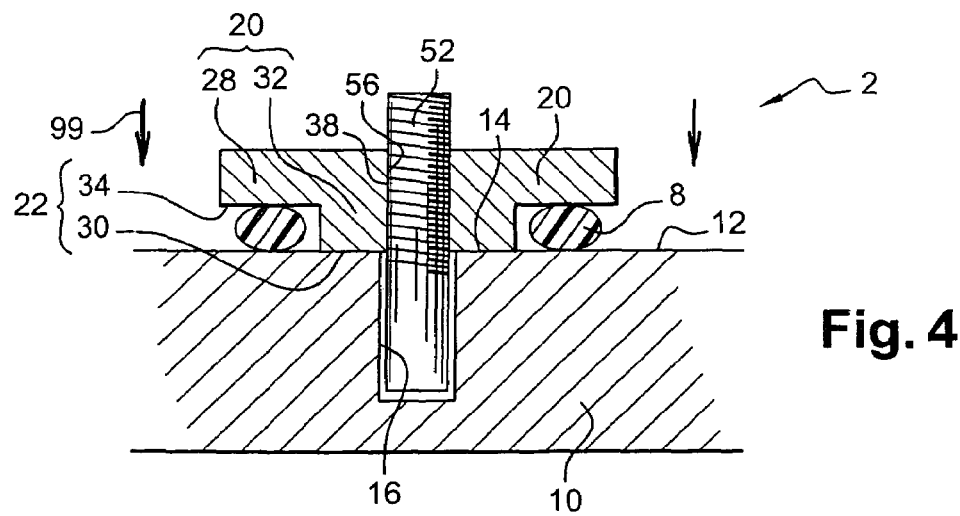
FIG. 4 shows a longitudinal section illustrating fastening means according to a second variant of the first embodiment of the connection device.

According to a second variant of the first embodiment shown in FIG. 4, the fastening means may comprise a second thread 56 of the rod 52 and a thread 38 in the hole of the contact part 36, that cooperate to fix the rod 52 to the contact part 20 which is fixed to the support 10 by other fastening means.

Figure 5:
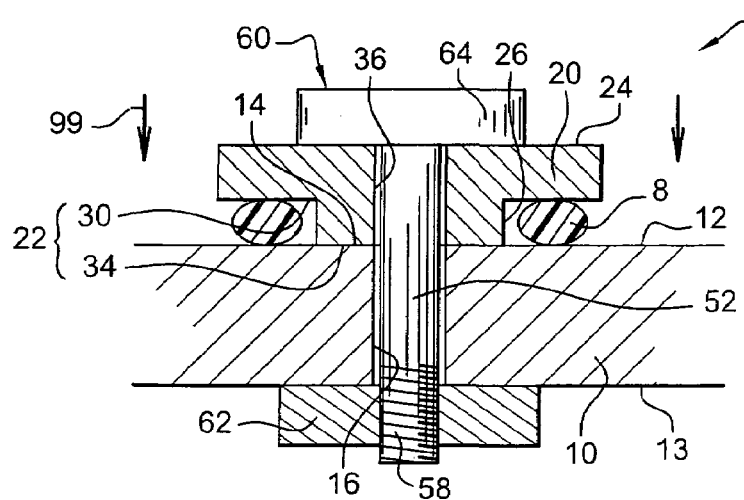
FIG. 5 shows a longitudinal section illustrating fastening means according to a third variant of the first embodiment of the connection device.

According to a third variant of the first embodiment shown in FIG. 5, particularly adapted to a support comprising a through hole opening up on the conducting face 12 of the support 10 and on a second face 13 of the support 10 that may or may not be conducting, said fastening means 18, 36, 38, 52, 54, 56, 58, 60, 62, 64 also comprise:

a nut 62, that will be placed on the side of the second face 13 of the support 10, when in service, a third thread 58 of the rod 52 that cooperates with said nut 62, a screw head 64 that prolongs said rod 52 so as to form a screw 60, said screw head 64 being designed to bear in contact with the second face 24 of the contact part 20, when in service.

The three variants may also be combined together, in pairs or all three together. The first thread 54, the second thread 56 and the third thread 58 of the rod 52 may be identical or different from each other.

Figure 6:
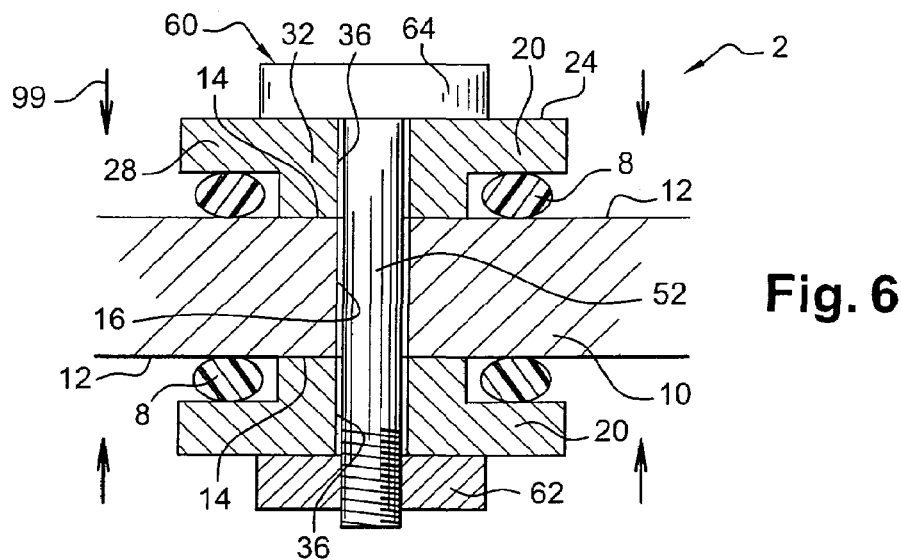
FIG. 6 shows a longitudinal section illustrating the first variant of the second embodiment.
Figure 7:
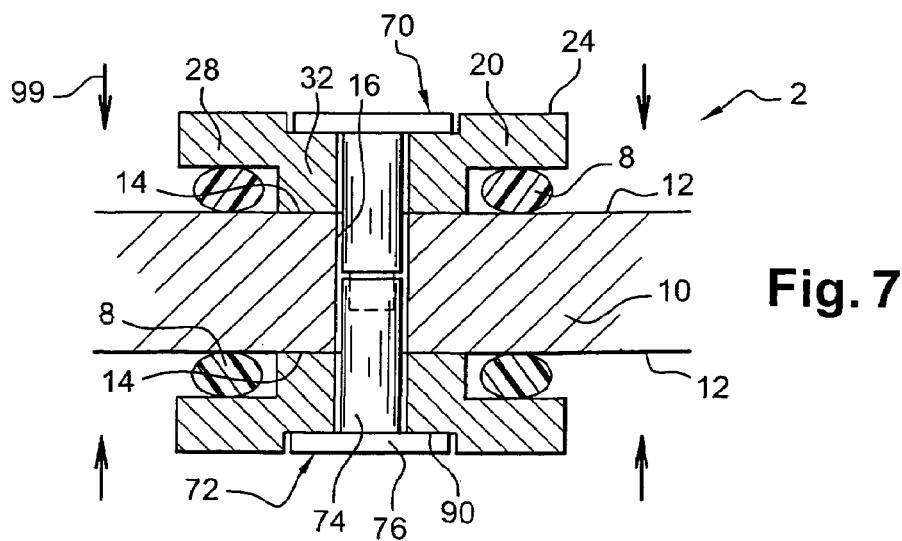
FIG. 7 shows a longitudinal section illustrating the second variant of the second embodiment.
Figure 8:
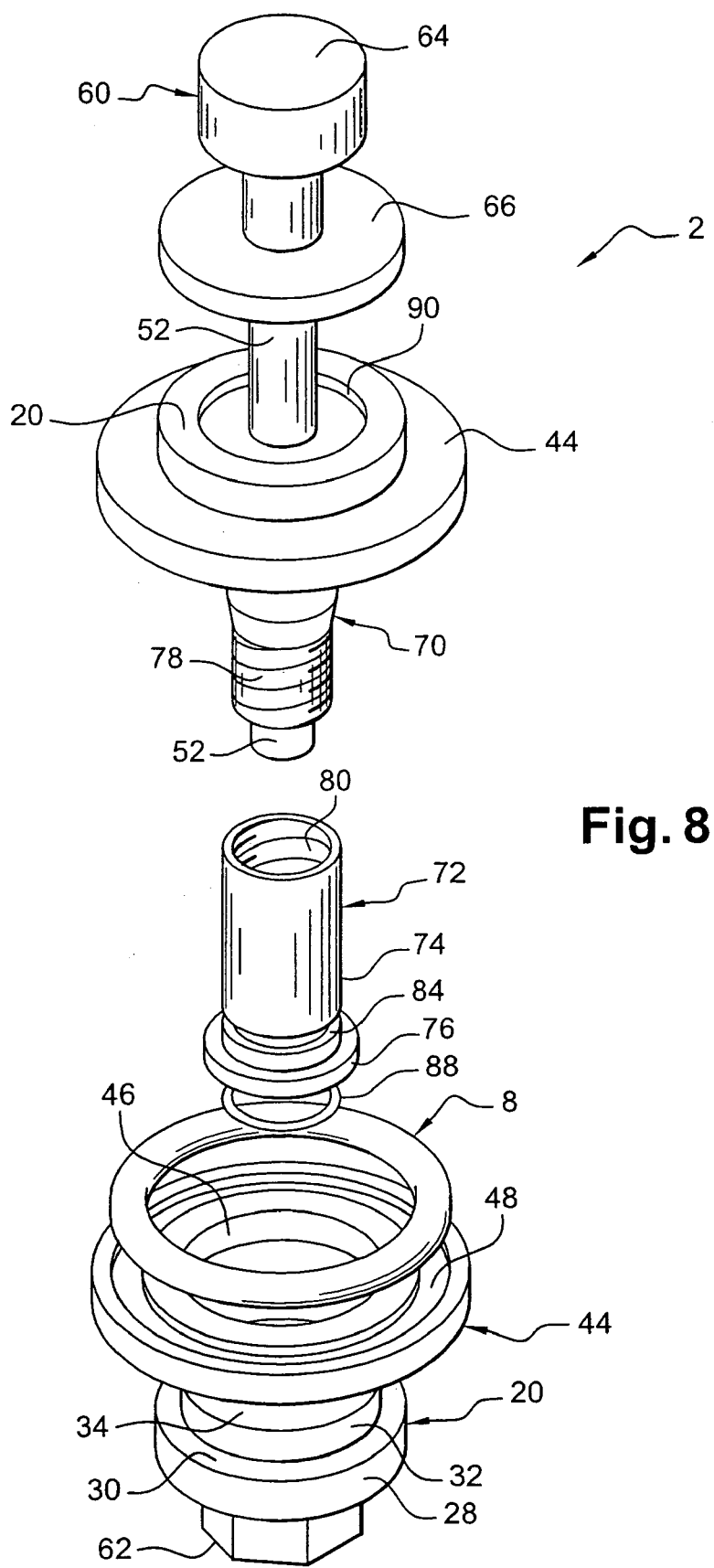
FIG. 8 shows a semi-exploded perspective view illustrating a connection device according to the third variant of the second embodiment.

According to the second embodiment shown in FIGS. 6 to 8, the connection device 2 comprises two contact parts 20, two seals 8 and fastening means 36, 60, 62, 64, 66, 70, 72, 76, 78, 80, 82 of the connection device 2 onto the support 10. It is particularly adapted to a support 10 comprising two electrically conducting faces 12 substantially opposite each other and through which there is a support hole 16 that opens up on each of the two conducting faces 12.

The two contact parts 20 are preferably similar to each other and similar to the contact part 20 of the first embodiment of the connection device 2.

The seals 8 are preferably similar to each other and similar to the seal 8 of the first embodiment.

The fastening means 36, 60, 62, 64, 66, 70, 72, 76, 78, 80, 82 fastening the connection device 2 onto the support 10 are also capable of maintaining electrical contact between each conducting face 12 of the support 10 and the corresponding contact part 20. They comprise:
- a hole 36 in one of the two contact parts 20, passing through it along an axial direction substantially centred with respect to its peripheral part 28 and with respect to its central part 32,
- a hole 36 in the other of the two contact parts 20, passing through it along an axial direction substantially centred with respect to its peripheral part 28 and with respect to its central part 32,
- through fastening means 60, 62, 70, 72 along an axial direction and designed to pass firstly through the hole 36 in one of the contact parts 20, then the support hole 16, then the hole 36 in the other contact part 20, when in service.

According to a first variant of the second embodiment shown in FIG. 6, the through fastening means 60, 62, 70, 72 comprise a screw/nut assembly 60, 62. The stem 52 of the screw 60 is designed to pass through the hole 36 in one of the contact parts 20, then the hole 16 in the support 10, then the hole 36 in the other contact part 20, when in service. The head 64 of the screw 60 is designed to bear in contact with the second face 24 of one of the contact parts 20, when in service, while the nut 62 is designed to bear in contact with the second face 24 of the other contact part 20, when in service.

According to a second variant of the second embodiment shown in FIG. 7, the through fastening means comprise two clamping parts 70, 72. Each clamping part 70, 72 comprises a cylindrical part 74 that terminates at one end by an end collar 76 projecting towards the outside, and is fitted with locking means 78, 80 at the other end. The locking means 78, 80 of the two clamping parts 70, 72 can cooperate to lock said two clamping parts 70, 72 together. The end collars 76 are designed to bear in contact with the second corresponding faces 24 of the contact parts 20, when in service.

The locking means 78, 80 comprise parts 78 projecting from one of the clamping parts 70 and recessed parts 80 in the other clamping part 72. The projecting parts 78 and the recessed parts 80 are formed close to the end of the cylindrical part 74 opposite the end collar 76. They are designed to engage each ether so as to nest into each other under the action of an axial compression applied to the two clamping parts 70, 72, when in service. When in service, the end collar 76 of one of the clamping parts 70, 72 will bear in contact with the second face 24 of one of the contact parts 20, and the end collar 76 of the other clamping part 70, 72, will bear in contact with the second face 24 of the other contact part 20.

According to a third variant of the second embodiment shown in FIG. 8, the cylindrical parts 74 of the clamping parts 70, 72 are axially hollow and the through fastening means 60, 62, 70, 72 also comprise a screw/nut assembly 60, 62. When in service, the rod 52 of the screw 60 passes through one and then through the other clamping part 70, 72 and the head 64 of the screw 60 bears in contact with the end collar 76 of one of the two clamping parts 70, 72, while the nut 62 bears in contact with the end collar 76 of the other clamping part 70, 72.

Preferably, according to the second variant and/or the third variant of the second embodiment, the cylindrical part 74 of each clamping part 70, 72 comprises an annular groove 84 arranged circumferentially on its outside face and close to its end collar 76 (see FIG. 8). The connection device 2 also comprises two annular sealing members 88, each annular sealing member 88 being designed to be inserted into one of said annular grooves 84, when in service. The annular sealing members 88 are preferably O-rings.

According to the second and/or third variant of the second embodiment, the second face 24 of the clamping part 20 preferably comprises a recess 90 arranged substantially centrally and designed to at least partly house the end collar 76 of the clamping part 70, 72 that bears on said second face 24 (see FIG. 8).

According to the second variant of the second embodiment, the clamping parts 70, 72 are made from a conducting material in order to make the electrical contact of the metallisation point, for example, from metal such as steel for which the surface may be treated against corrosion.

According to the third variant of the second embodiment, the electrical contact is made by the screw/nut assembly 60, 62. In this case, the clamping parts 70, 72 may be made from a non-conducting material, for example a plastic material, which can reduce manufacturing costs when parts are made in large quantities.

In the same way in the first and second embodiments, when the fastening means comprise a screw/nut assembly 60, 62, this assembly may be accompanied by a clamping washer 66 placed on the side of the head of the screw 60, and/or a clamping washer 66 placed on the side of the nut 62. This type of clamping washer 66 is shown in FIG. 8.

In the same way in the first and second embodiments, the connection device 2 comprises retaining means 42, 44, 48 for each seal 8.

Figure 9:
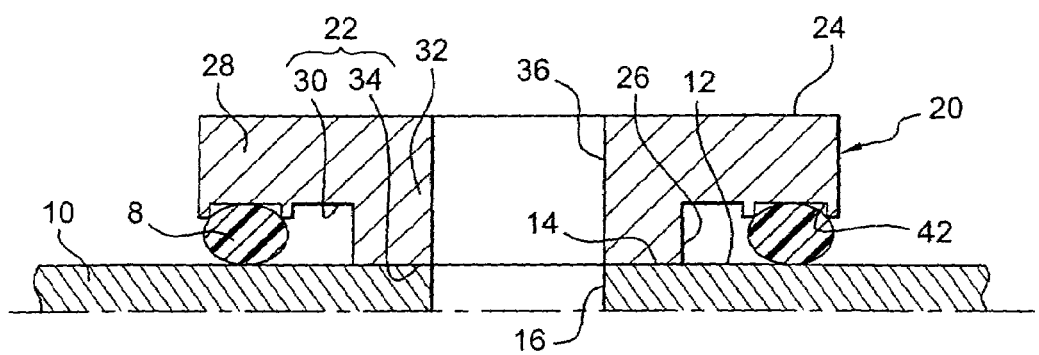
FIG. 9 shows a longitudinal section illustrating an example embodiment of seal retaining means according to the invention.

According to a first variant embodiment shown in FIG. 9, the retaining means 42, 44, 48 for each seal 8 comprise an annular groove 42 formed on the peripheral face 30 of the contact part 20 so as to face the corresponding support face 12, when in service. When the contact part 20 is fixed on the support 10 under the action of fastening means, the seal 8 is compressed between said peripheral face 30 and the support face 12 (arrows 99 in FIGS. 2 to 7) and is retained by said groove 42.

Figure 10:
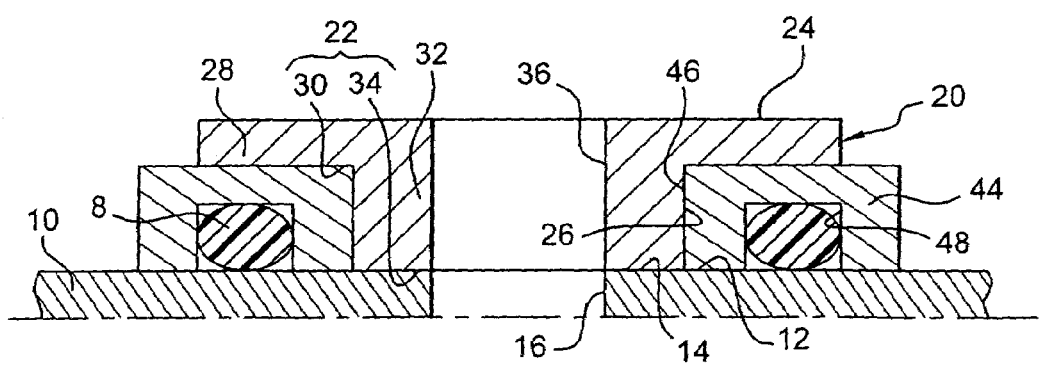
FIG. 10 shows a longitudinal section illustrating another example embodiment of seal retaining means according to the invention.
Figure 2:
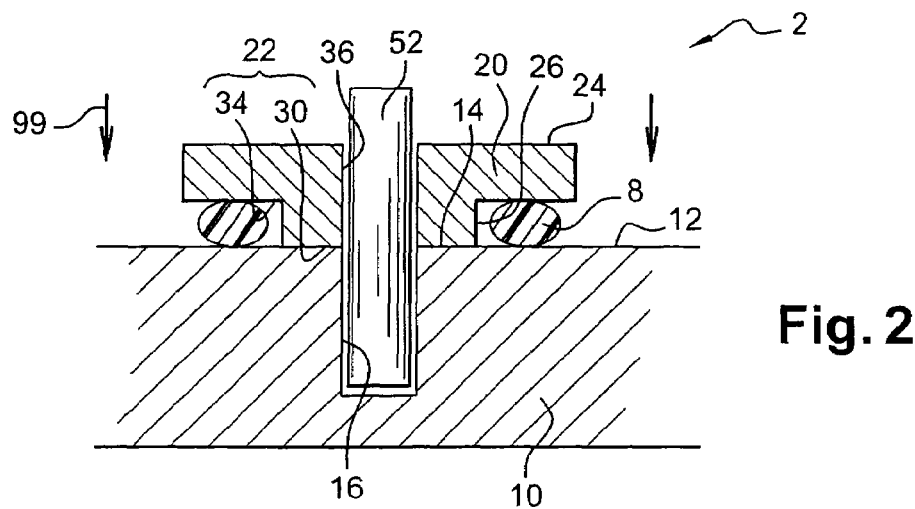
FIG. 2 shows a longitudinal section illustrating the first embodiment of the connection device according to the invention, in general.

According to a second variant embodiment shown in FIG. 10, the retaining means 42, 44, 48 for each seal 8 comprise an insert 44 that will be inserted between the peripheral face 30 of the contact part 20 and the support face 12, when in service. An insert hole 46 passes through the insert 44, and is sized so as to house and surround the central part 32 of the contact part 20, while the peripheral face 30 of the contact part 20 bears on said insert 44. The insert is provided with an annular groove 48 formed on one of its faces that in service will face the corresponding support face 12. When the contact part 20 is fixed on the support 10 under the action of the fastening means, the seal 8 is compressed between said insert 44 and the support face 12 (arrows 99 in FIGS. 2 to 7), and is retained by said groove 48. Preferably, the insert 44 is made from a non-conducting material, for example made of plastic.

According to a second aspect, the invention also relates to a support 10 with at least one electrically conducting face 12 provided with at least one connection device 2 conform with the first aspect of the invention, so as to make a metallisation point on the support 10.

The fastening means 18, 36, 38, .52, 54, 56, 58, 60, 62, 64, 66, 70, 72, 76, 78, 80, 82 fastening the connection device 2 onto the support 10 are adapted to said support 10.

When the support 10 comprises a single conducting face 12 and has a non-through support hole 16, a connection device 2 according to the first or second variant of the first embodiment is preferably associated with said support 10.

When the support 10 comprises a single conducting face 12 and has a through support hole 16, a connection device 2 according to the third variant of the first embodiment is preferably associated with said support.

When the support 10 comprises two conducting faces 12 substantially opposite each other and with a through support hole 16, a connection device 2 according to the second embodiment is preferably associated with said support 10.

The conducting face 12 of the support 10 comprises at least one contact area 14 that is designed to come into contact with the central face 34 of the corresponding contact part 20, in order to make a metallisation point. This contact area 14, shown in FIGS. 9 and 10, is stripped so as to make the electrical contact. When there are one or several through or non-through support holes 16 in the support 10, said contact area 14 is preferably located around an orifice in said support hole(s) (16).

Metallic parts are treated against corrosion, for example by means of a nickel-based protection.

What is claimed is:

1. An electrical connection device, designed to make a metallisation point on a support, said support having two electrically conducting support faces substantially opposite each other, and a support hole passing through said support, that opens up on each of said support faces, said electrical connection device comprising:
   two electrically conducting contact parts, each with a peripheral part and a central part, and each having first and second substantially opposite faces, each first face having a peripheral face corresponding to the peripheral part and a central face corresponding to the central part, the peripheral face and the central face being delimited by a shoulder, and said central face being substantially plane so as to come substantially into plane contact with one of said support faces, when in service,
   two seals designed to be compressed between the peripheral face on one of the contact parts and on one of the two support faces respectively, when in service, and
   means of fastening the device on the support, capable of maintaining electrical contact between said conducting support faces and said contact parts,
   wherein the means of fastening comprise:
      a hole in each of the two contact parts, passing through it along an axial direction substantially centred with respect to its central part and its peripheral part, and
   through fastening means with an axial direction, designed to pass firstly through the hole in one of the contact parts, then through the support hole, then through the hole in the other contact part, when in service,
   wherein said through fastening means comprise two clamping parts, each clamping part comprising a cylindrical part terminating at one end by an end collar and provided with locking means at the other end, said locking means being capable of cooperating to lock said two clamping parts together, and each end collar being designed to bear in contact with the second face of one of the two contact parts, when in service, and
   wherein the cylindrical parts of said clamping parts are hollow and said through fastening means also comprise a screw/nut assembly, the screw having a screw stem designed to pass through one and then the other clamping parts when in service, and the screw having a screw head designed to bear in contact with the end collar of one of the clamping parts when in service, and the nut being designed to bear in contact with the end collar of the other clamping part when in service.

2. The electrical connection device according to claim 1, wherein the locking means comprise parts projecting from one of the clamping parts and recessed parts in the other clamping part, said projecting parts and said recessed parts being designed to mutually grip, when in service.

3. The electrical connection device according to claim 1 further comprising two annular sealing members, each annular sealing member being designed to be inserted into an annular groove of one of the clamping parts, when in service.

4. The electrical connection device according to claim 3, wherein said annular sealing members are O-rings.

5. The electrical connection device according to claim 1, wherein said clamping parts are made from plastic material.

6. The electrical connection device according to claim 1, wherein the fastening means comprise also a washer designed to be used with the head of the screw, when in service and/or a washer designed to be used with the nut, when in service.

7. The electrical connection device according to claim 1, wherein the contact part(s) is are made from metal.

8. The electrical connection device according to claim 7, wherein the contact part(s) is (are) made from steel and its (their) surface is treated against corrosion.

9. The electrical connection device according to claim 1, wherein the seal is O-rings.

10. The electrical connection device according to claim 1, further comprising retaining means for each seal.

11. The electrical connection device according to claim 10, wherein said retaining means for said seal comprise a groove formed on the peripheral face of the corresponding contact part.

12. The electrical connection device according to claim 10, wherein said retaining means for said seal comprise an insert, said insert being designed to be inserted between the peripheral face of the corresponding contact part and the corresponding support face, when in service, and said insert being provided with a groove.

13. The electrical connection device according to claim 12, wherein an insert hole passes through said insert, and is sized so as to house the central part of the corresponding contact part, when in service.

14. The electrical connection device according to claim 12, wherein said insert is made from plastic material.

15. An electrically conducting support, comprising two electrically conducting support faces substantially opposite each other, and a support hole passing through said support that opens up on each of said support faces, wherein said support is provided with at least one connection device according to claim 1, so as to make at least one metallisation point on said support.

16. The electrically conducting support according to claim 15, wherein its conducting face(s) comprises a contact area designed to be in contact with the central face of a contact part, and in that said contact area is stripped.

17. An aircraft equipped with at least one support according to claim 15.

18. The electrical connection device according to claim 13, wherein said insert is made from plastic material.

* * * * *